United States Patent
Barker

(10) Patent No.: US 8,397,502 B2
(45) Date of Patent: *Mar. 19, 2013

(54) AUTOMOTIVE AIR BLOWERS

(75) Inventor: David Luke Barker, Northampton (GB)

(73) Assignees: Drivetec (UK) Limited, London (GB); Integral Powertrain Limited, Milton Keynes (GB)

( * ) Notice: Subject to any disclaimer, the term of this patent is extended or adjusted under 35 U.S.C. 154(b) by 59 days.

This patent is subject to a terminal disclaimer.

(21) Appl. No.: 12/699,092

(22) Filed: Feb. 3, 2010

(65) Prior Publication Data

US 2010/0132637 A1 Jun. 3, 2010

Related U.S. Application Data

(63) Continuation of application No. 10/545,600, filed as application No. PCT/GB2004/000570 on Feb. 13, 2004, now Pat. No. 7,703,283.

(30) Foreign Application Priority Data

Feb. 17, 2003 (GB) .................................. 0303605.0
Feb. 24, 2003 (GB) .................................. 0304047.4

(51) Int. Cl.
*F02B 33/44* (2006.01)
*F02B 39/12* (2006.01)
*F02B 39/10* (2006.01)
*F16H 3/72* (2006.01)
*F16H 37/06* (2006.01)
*F16H 57/02* (2012.01)
*B60K 17/04* (2006.01)
*F02D 25/00* (2006.01)
*F02D 9/04* (2006.01)

(52) U.S. Cl. .................. 60/608; 475/5; 475/2; 290/4 C

(58) Field of Classification Search ............ 60/607–609; 290/4 R, 4 C, 52; 475/5, 183, 339; 477/2–5; 417/362, 374, 423.6; *F16H 3/72; B60K 17/04*
See application file for complete search history.

(56) References Cited

U.S. PATENT DOCUMENTS

| | | | |
|---|---|---|---|
| 1,977,553 A * | 10/1934 | Halford ........................ 475/52 |
| 2,585,029 A | 2/1952 | Nettel | |
| 2,908,189 A | 10/1959 | Chapman et al. | |
| 3,295,395 A | 1/1967 | Willard | |
| 3,307,426 A | 3/1967 | Whitaker | |
| 4,251,987 A | 2/1981 | Adamson | |
| 4,260,919 A | 4/1981 | Fleming | |
| 4,485,793 A | 12/1984 | Oguma | |
| 4,514,991 A | 5/1985 | Zinsmeyer | |
| 5,158,427 A | 10/1992 | Shirai | |
| 5,309,778 A | 5/1994 | Antonov | |

(Continued)

FOREIGN PATENT DOCUMENTS

DE 1237380 B 3/1967
DE 29 26426 A1 1/1981

(Continued)

*Primary Examiner* — Thai Ba Trieu
(74) *Attorney, Agent, or Firm* — Young & Thompson

(57) ABSTRACT

An automotive air blower, in particular a supercharger, includes an air pump, such as an air impeller connected to the output shaft of a transmission system, the input shaft of which is connected, in use, to the engine of a motor vehicle. The input and output shafts are connected to respective branches of a three-branch epicyclic differential gearset. The third branch of the gearset and the input shaft are connected to the rotor of respective electrical machines, the electrical connections of the stators of which machines are connected together via a controller arranged to control the flow of electric power between them.

12 Claims, 4 Drawing Sheets

U.S. PATENT DOCUMENTS

| | | |
|---|---|---|
| 5,476,293 A | 12/1995 | Yang |
| 5,508,574 A | 4/1996 | Vlock |
| 5,917,248 A | 6/1999 | Seguchi et al. |
| 6,551,208 B1 | 4/2003 | Holmes et al. |
| 6,681,574 B2 | 1/2004 | Berglund et al. |
| 6,768,237 B1 | 7/2004 | Schroedl |
| 6,895,741 B2 | 5/2005 | Rago et al. |
| 7,000,601 B2 | 2/2006 | Yasui et al. |
| 7,172,524 B2 * | 2/2007 | Moeller ............ 475/5 |
| 7,239,033 B2 | 7/2007 | Motoike et al. |
| 7,455,608 B2 * | 11/2008 | Moeller ............ 475/5 |
| 7,914,411 B2 * | 3/2011 | Basteck ............ 475/35 |
| 2007/0149336 A1 | 6/2007 | Sallstrom |
| 2007/0213161 A1 | 9/2007 | Tabata et al. |
| 2008/0020887 A1 | 1/2008 | Moeller |
| 2008/0093137 A1 | 4/2008 | Maeda et al. |
| 2010/0186725 A1 * | 7/2010 | Barker ............ 123/559.3 |

FOREIGN PATENT DOCUMENTS

| | | |
|---|---|---|
| EP | 1281559 A1 * | 2/2003 |
| GB | 644096 | 10/1950 |
| GB | 2 398108 A | 8/2004 |
| GB | 2405129 A | 2/2005 |
| JP | 60-128935 A | 7/1985 |
| JP | 3-179141 | 8/1991 |
| JP | 03 182652 A | 8/1991 |
| JP | 09 226392 A | 9/1997 |
| JP | 2003 336725 A | 11/2003 |
| WO | WO 03047897 A1 * | 6/2003 |
| WO | 03 055709 A1 | 7/2003 |
| WO | 2008135722 | 11/2008 |

* cited by examiner

AUTOMOTIVE AIR BLOWERS

CROSS REFERENCE TO RELATED APPLICATIONS

This application is a continuation of co-pending application Ser. No. 10/545,600 filed on May 8, 2006, which is the 35 U.S.C. §371 national stage of International PCT/GB04/00570 filed on Feb. 13, 2004, which claims priority to British application No. 0304047.4 filed on Feb. 24, 2003 and of British application No. 0303605.0 filed on Feb. 17, 2003. The entire contents of each of the above-identified applications are hereby incorporated by reference. Any disclaimer that may have occurred during prosecution of the above referenced applications is hereby expressly disclaimed.

The present invention refers to automotive air blowers and, in particular to automotive superchargers, which are devices which may be incorporated in automotive engines.

BACKGROUND OF THE INVENTION

Superchargers are devices that include an air pump or blower wheel, rotation of which changes the pressure conditions in the inlet system of the engine, the inlet pressure. Commonly the device is configured and operated in a way that increases the inlet pressure and therefore enables the power output of the engine to be increased. Alternatively the device may be configured to lower the Inlet Pressure and reduce the power output, this method of power control offering efficiency advantages when compared with the conventional method of load control through a throttle valve.

An air blower in accordance with the invention may, however, also take other forms, such as an automotive cooling fan for blowing air over a cooling radiator.

Currently Superchargers are driven mechanically (usually with fixed speed ratio) by the engine, electrically or by a turbine which extracts energy from exhaust gases (known as Turbochargers).

With practical applications the simple mechanical drive has certain disadvantages including insufficient ability to increase performance at low engine speed and poor power control capability. At high engine speed and load, wasteful bypass or dump valves are sometimes required to prevent inlet pressure becoming higher than required or desired.

Practical applications of electrically driven superchargers are often limited by the cost, mass and package size of the electrical machinery required to power the supercharger when high power output is required from the engine. The efficiency of these devices is also compromised by losses incurred when converting mechanical energy into electrical energy and vice-versa.

Practical applications of Turbochargers are commonplace. The inlet pressure available at a given condition is very strongly dependent on the exhaust gas flow rate, temperature and pressure however. Under transient conditions when the rotational speed of the device changes, the inertia of the rotating components also substantially affects the inlet pressure. These effects often result in an undesirable lack of power output from the engine at low engine speed and under transition from low power output to high power output. These characteristics are particularly undesirable in automotive applications. Consequently various attempts have been made to improve the performance of Turbochargers in these respects. Some improvement is enabled by providing guide vanes with variable pitch. This technology is commonly applied to automotive diesel engines but benefits to gasoline engines are limited by higher exhaust gas temperature and associated materials technology and lubrication issues.

Previously it has been proposed that a supercharger can be mechanically driven by the engine via a transmission system with a continuously variable speed ratio. This offers large improvements in performance at low engine speed and in load control. For reasons which include cost, reliability, durability and package size, systems of this type have generally proved to be unattractive to the market.

It is therefore the object of the invention to provide a supercharger which is commercially attractive, efficient and which is able to vary inlet pressure across a wide range independent of engine speed.

SUMMARY OF THE INVENTION

According to the present invention, an automotive air blower comprises an air pump connected to the output shaft of a transmission system, the input shaft of which is connected, in use, to the engine of a motor vehicle. The transmission incorporates a three-branch differential gearset. One branch is connected to the output, another is connected to the input and the third is connected to an electrical machine having motoring capability alone or motoring and generating capability. A further electrical machine, having generating capability alone or generating and motoring capability, is connected to the input. The electrical connections of the stators of the electrical machines are connected together via a controller arranged to control the flow of electric power between them.

During operation, power can be transmitted from the engine to the air pump, in parallel, by mechanical means (i.e. via the gears) and electrical means (i.e. mechanical power is converted to electrical power by one electrical machine, and transmitted to the other electrical machine where it is converted back into mechanical power). The power transmitted by electrical means can be controlled by the controller. The ratio of electrical to mechanical power varies with the speed ratio of transmission output to input and hence the controller can be used to change the speed ratio.

When the engine is operating at low speed but a high inlet pressure is required, the speed ratio of the transmission system is high and the ratio of electrical to mechanical power is highest. If the engine is operating at high speed and a high inlet pressure is required, the ratio of electrical to mechanical power is low. The construction in accordance with the invention enables operation across a wide range of speed ratios. Appropriate ratio selection enables a very high output speed to be attained for a comparatively low input speed.

It is preferred that the electrical machines have high efficiency and are compatible with the automotive environment. Switched reluctance motors meet these requirements; induction and permanent magnet types may also meet these requirements.

The air blower in accordance with the invention may be electrically self powered (requiring no external power source). However in the preferred embodiment, the electrical connections of the stators are also connected to a battery and the controller is arranged to control the flow of power between the electrical machines and the battery.

Conventional automotive engines are connected to a battery to enable starting and to make available a number of functions when the engine is not running. A battery is, therefore, in any event normally present. However, the provision of two electrical machines in the air blower in accordance with the present invention opens up the possibility of using one or both of the electrical machines for engine starting purposes and also to take over the function of the alternator, which is traditionally provided for the generation of electricity to recharge the battery. The electrical machines may thus constitute so-called Starter Generator units, thereby permitting the conventional starter motor and alternator to be omitted. Under certain conditions it may be beneficial to augment the electrical energy provided by the generating electrical machine to the motoring electrical machine by providing energy from the battery thereby improving the transient performance of the engine in combination with the air blower. For short durations it may even be desirable to provide sufficient electrical energy such that both electrical machines operate as motors using energy from the battery thereby further improving the transient response of the engine in combination with the air blower.

Epicyclic gearsets may be divided into two basic types, that is to say negative type and positive type. In epicyclic gearsets of negative type, when one gear element is rotated in one direction and the carrier element is held stationary, the third gear element rotates in the other direction. In epicyclic gearsets of positive type, if one gear element is rotated in one direction and the carrier element is held stationary, the third gear element rotates in the one direction, that is to say in the same direction as the first gear element.

The gearwheels of the epicyclic gearset may be toothed wheels and in this event drive is transmitted between engaging gearwheels by engagement of their teeth. However, the gearwheels may alternatively be relatively smooth and constitute so-called friction or traction wheels and in this event drive is transmitted between engaging gearwheels by frictional engagement of the rolling traction wheels or by the shearing of fluid between such wheels.

In one embodiment of the invention, the air blower is a supercharger of the type which includes a centrifugal impeller wheel. In this case, the epicyclic gearset may comprise a sun wheel which is in engagement with a plurality of planet wheels, which are carried by a common carrier and are in engagement with an annulus wheel, the sun wheel being connected to the impeller wheel, the annulus wheel being connected to the input shaft, which is connected to the rotor of one of the electrical machines, and the carrier being connected to the rotor of the second electrical machine.

In another embodiment of the invention, the air blower is a supercharger of the type which includes a centrifugal impeller wheel. In this case, the epicyclic gearset may comprise a sun wheel which is in engagement with a plurality of planet wheels, which are carried by a common carrier and are in engagement with an annulus wheel, the sun wheel being connected to the impeller wheel, the carrier being connected to the input shaft which is connected to the rotor of one of the electrical machines and the annulus wheel being connected to the rotor of the second electrical machine.

In another embodiment of the invention, the air blower is of a relatively low speed type in which the air pump is of the positive displacement type or is a cooling fan. In this case, the epicyclic gearset may comprise a sun wheel, which is in engagement with a plurality of planet wheels, which are carried by a common carrier and are in engagement with an annulus wheel, the annulus wheel being connected to the air pump, the carrier being connected to the input shaft which is connected to the rotor of one of the electrical machines and the sun wheel being connected to the rotor of the second electrical machine.

In another embodiment of the invention, the air blower is of a relatively low speed type in which the air pump is of the positive displacement type or is a cooling fan. In this case, the epicyclic gearset may comprise a sun wheel which is in engagement with a plurality of planet wheels, which are carried by a common carrier and are in engagement with an annulus wheel, the carrier being connected to the air pump, the annulus wheel being connected to the input shaft which is connected to the rotor of one of the electrical machines and the sun wheel being connected to the rotor of the second electrical machine.

In another embodiment of the invention, the air blower is of a relatively low speed type in which the air blower is of the positive displacement type or is a cooling fan. In this case, the epicyclic gearset may comprise a sun wheel, which is in engagement with a plurality of planet wheels, which are carried by a common carrier and are in engagement with an annulus wheel, the carrier being connected to the air pump, the sun wheel being connected to the input shaft, which is connected to the rotor of one of the electrical machines, and the annulus wheel being connected to the rotor of the second electrical machine.

In another embodiment of the invention, the air blower is of a relatively low speed type in which the air pump is of the positive displacement type or is a cooling fan. In this case, the epicyclic gearset may comprise a sun wheel which is in engagement with a plurality of planet wheels, which are carried by a common carrier and are in engagement with an annulus wheel, the annulus wheel being connected to the air pump, the sun wheel being connected to the input shaft, which is connected to the rotor of one of the electrical machines, and the carrier being connected to the rotor of the second electrical machine.

Alternatively, the epicyclic gearset may comprise a first sunwheel, which is in meshing engagement with a plurality of first planet wheels, and a second sun wheel, which is in mesh with a plurality of second planet wheels, each first planet wheel being connected to a respective second planet wheel, each connected pair of first and second planet wheels being carried by a respective common planet shaft, the planet shafts being connected to a common carrier, one of the sun wheels being connected to the air pump, the other sun wheel being connected to the input shaft, which is connected to the rotor of one of the electrical machines, and the carrier being connected to the second electrical machine.

In a further embodiment, the epicyclic gearset may comprise a first sunwheel, which is in meshing engagement with a plurality of first planet wheels, and a second sun wheel, which is in mesh with a plurality of second planet wheels, each first planet wheel being connected to a respective second planet wheel, each connected pair of first and second planet wheels being carried by a respective common planet shaft, the planet shafts being connected to a common carrier, one of the sun wheels being connected to the air blower, the carrier being connected to the input shaft, which is connected to the rotor of one of the electrical machines, and the other sun wheel being connected to the second electrical machine.

In a further embodiment, the epicyclic gearset may comprise a first sunwheel, which is in meshing engagement with a plurality of first planet wheels, and a second sun wheel, which is in mesh with a plurality of second planet wheels, each first planet wheel being connected to a respective second planet wheel, each connected pair of first and second planet wheels being carried by a respective common planet shaft, the planet shafts being connected to a common carrier, the carrier being connected to the air pump, one of the sun wheels being connected to the input shaft, which is connected to the rotor of one of the electrical machines and the other sun wheel being connected to the second electrical machine.

It is preferred that the blower in accordance with the invention is so arranged that, at relatively low speed ratios of the air pump to the input from the engine, one of the electrical machines operates as a generator and produces electrical power, which is transmitted to the other electrical machine, which operates as a motor, and that, at relatively high speed ratios of the air pump, the other electrical machine operates as a generator and produces electrical power, which is transmitted to the one electrical machine, which operates as a motor. Thus in the preferred embodiment, at a constant input speed, the proportion of the input power transmitted between the two electrical machines progressively decreases, as the speed of the air pump increases, and then reaches zero, at the so-called node point, and then flows in the opposite direction, increasing with air pump speed. This means that both electrical machines operate as a motor and as a generator at differing operational speed ratios of the air pump. The node point is arranged to be close to the speed condition at which maximum power is required for the air pump so that the power rating of the electrical machines and thus their cost is minimised. Alternatively the node point could be arranged to provide maximum operational efficiency according to a given duty cycle. This will maximise the efficiency of the blower because the efficiency of power transmission mechanically is considerably higher than that of power transmission electrically.

The above embodiments of the invention can all be achieved with one of the electrical machines having no generating capability and the other having no motoring capability. Operation could then only be sustained at a speed ratio on one side of the node point, however, and not on both sides.

BRIEF DESCRIPTION OF THE DRAWINGS

Further features and details of the invention will be apparent from the following description of four specific embodiments which is given by way of example with reference to the accompanying drawings, in which.

Figure 1:
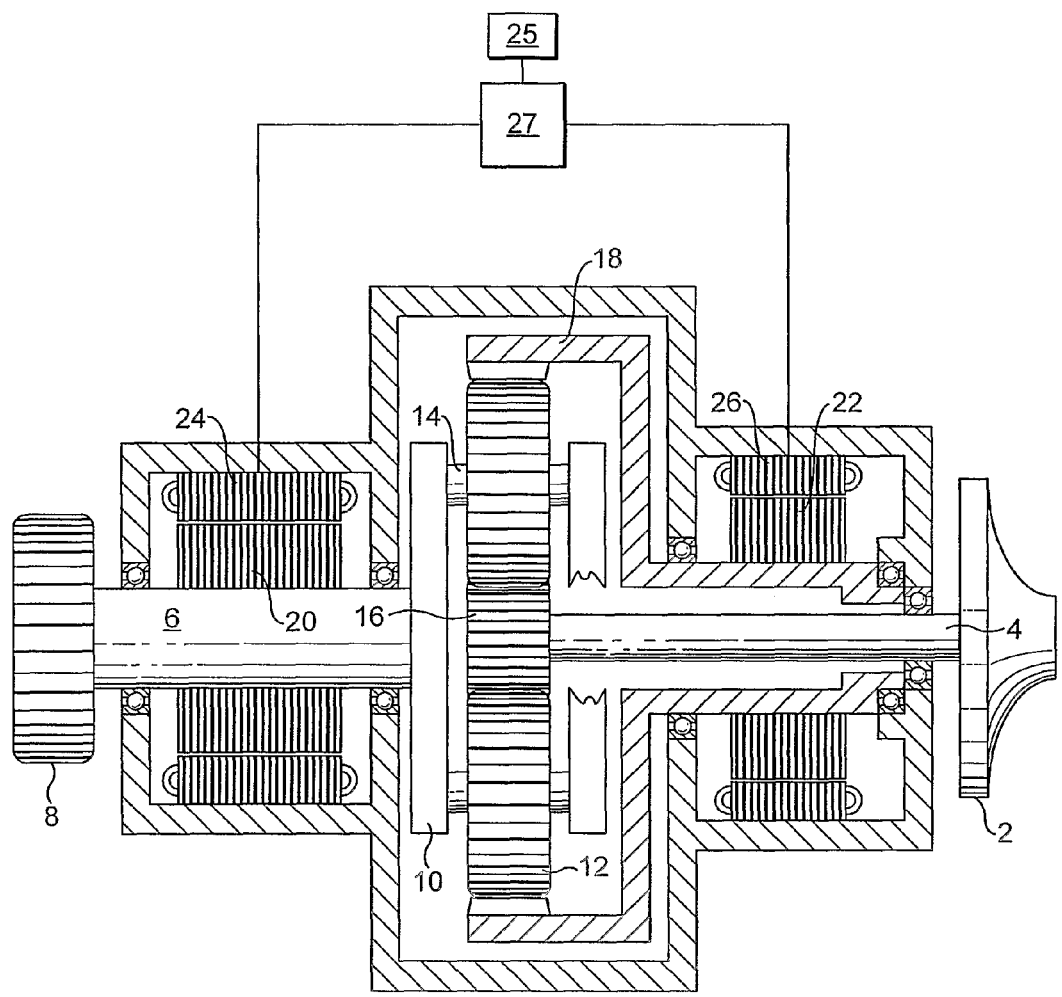
FIG. 1 is a diagrammatic sectional view of a first embodiment of a high speed automotive air blower in accordance with the invention, which constitutes a supercharger for a passenger carrying road vehicle.

Referring firstly to FIG. 1, the supercharger includes an air pump 2 which, in this case, constitutes a centrifugal air impeller which is situated, in use, in the inlet duct of an automotive engine. The impeller 2 is connected to the output shaft 4 of a transmission system, the input shaft 6 of which carries a pulley 8. In use, a pulley belt of known type will pass around the pulley 8 and round a further pulley driven by the engine and mounted on the engine crankshaft or some further shaft connected to be driven by the crankshaft. The two pulleys will typically be sized so as to produce a step-up ratio of the order of 3, whereby if the engine is rotating at, say, 1500 rpm, the input shaft will be rotated at 4,500 rpm.

The transmission system comprises an epicyclic gearset of negative type. The input shaft 6 is connected to a carrier 10, which carries a number, typically three, of toothed planet wheels 12 which are rotatably mounted on respective planet shafts 14. Each planet wheel 12 is in mesh with a toothed sun wheel 16, which is carried by the output shaft 4. The planet wheels 12 are also in mesh with a toothed annulus wheel 18.

The input shaft 6 and the annulus wheel 18 are connected to the rotor 20 and 22 of respective motor/generators which have respective stators 24, 26. The electrical connections of the two stators are connected together and, in use, to the battery 25 of the vehicle via a controller 27 which controls the flow of electrical power between the three units.

In use, a proportion of the power necessary to rotate the impeller is provided mechanically. One of the motor/generators acts as a generator and transmits electrical power to the other motor/generator, which acts as a motor and provides the remainder or substantially the remainder of the power required to rotate the impeller at the desired speed. If an amount of additional power is required, the controller 27 is operated to extract it from the battery 25. It may sometimes be desirable for all of the power to be provided by the battery, at least for brief periods of time. One or both of the motor/generators is in the form of an Integrated Starter Generator (ISG) unit and thus at those times when excess electrical power is available, the controller may be operated to transmit this power to the battery to recharge it. The ISG may thus replace the conventional automotive alternator and may also be used to start the engine and may thus also replace the conventional engine starter motor.

Figure 2:
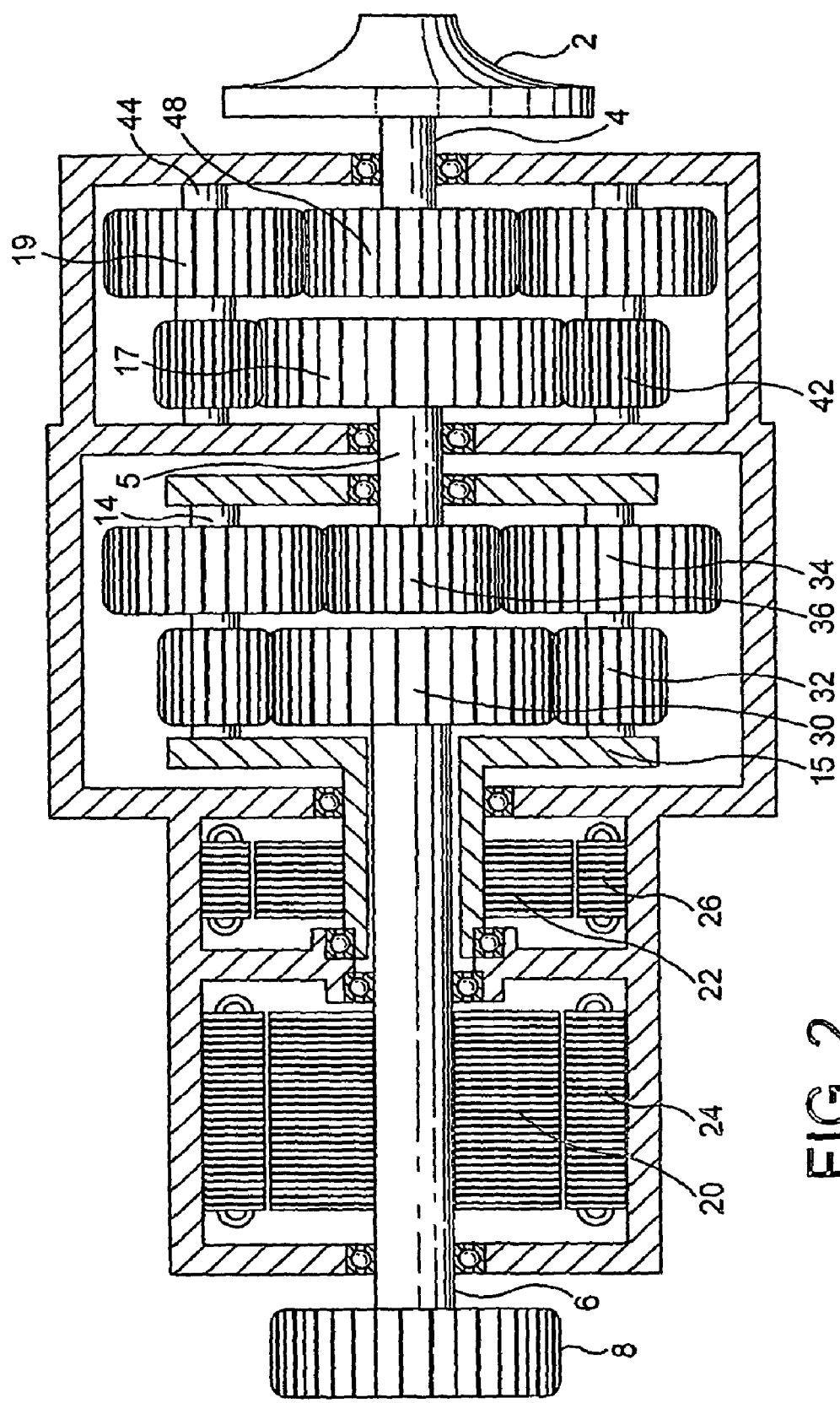
FIG. 2 is a view similar to FIG. 1 of a second embodiment of an automotive supercharger.

FIG. 2 shows a modified construction of supercharger and those components which are the same as those in FIG. 1 are provided with the same reference numerals. This embodiment differs from that of FIG. 1 in two major respects, namely the construction of the epicyclic gearset and thus also the connections of the rotors of the two motor/generators and the provision of step-up gearing between the output of the gearset and the impeller. The epicyclic gearset is of positive type. The input shaft 6 is connected to a first toothed sun wheel 30, which is in mesh with a number, typically three, of toothed first planet wheels 32, which are rotatably mounted on respective planet shafts 14. Each first planet wheel 32 is connected to a respective second toothed planet wheel 34, which is mounted on the same planet shaft 14. The planet wheels 34 are in mesh with a second toothed sun wheel 36, which is connected to an intermediate output shaft 5. The planet shafts 14 are mounted on a common carrier 15. The output shaft 5 is linked to the output or impeller shaft 4 through a fixed ratio speed-increasing gearbox. This gearbox may take many forms but in the specific embodiment illustrated in FIG. 2 it comprises a positive epicyclic transmission with a fixed step up ratio of 2.4:1.

The gearbox comprises a first sun wheel 17 which is connected to shaft 5 and is in mesh with a number, typically three, of first planet wheels 42. Planet wheels 42 are mounted on respective fixed planet shafts 44 and are directly connected to respective second planet wheels 19. Planet wheels 19 are in mesh with a second sun wheel 48, which is connected to output shaft 4.

The input shaft 6 and the planet carrier 15 are connected to the rotor 20 and 22 of respective motor/generators which have respective stators 24, 26. The electrical connections of the two stators are again connected together and, in use, to the battery of the vehicle via a controller, which controls the flow of electrical power between the three units.

The mode of operation of the supercharger illustrated in FIG. 2 is substantially the same as that described in connection with FIG. 1.

Figure 3:
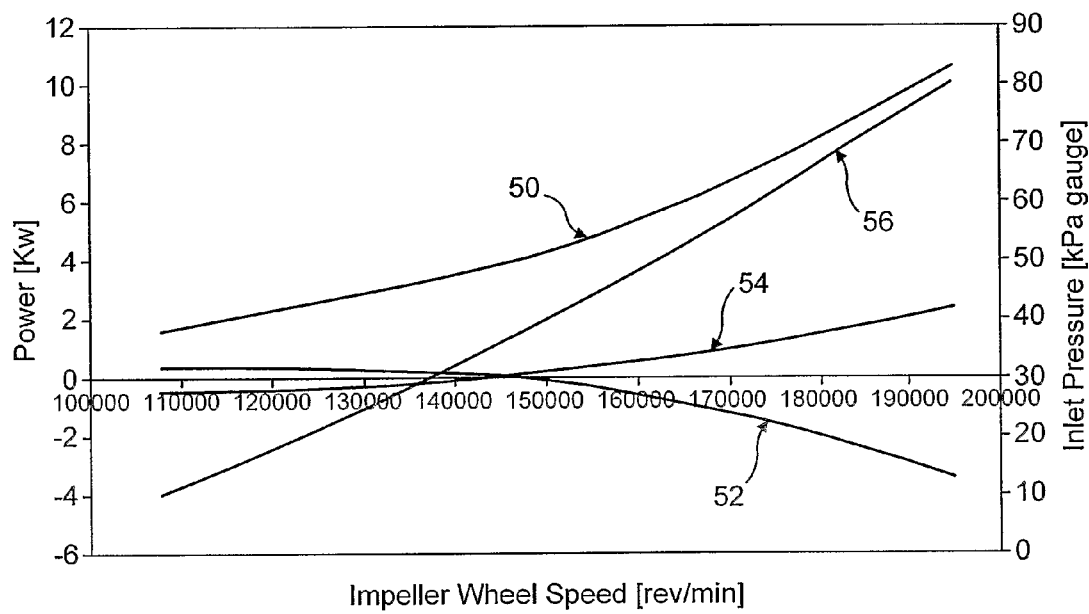
FIG. 3 is a graph showing the power flows and inlet duct pressure against impeller speed in the supercharger shown in FIG. 2.

FIG. 3 illustrates the power flows and the pressure in the inlet duct of an engine fitted with a supercharger of the construction illustrated in FIG. 2 as the speed of the impeller wheel (and hence boost pressure) is increased at constant engine speed. The condition illustrated has no electrical flow either to or from the battery. The curve designated 50 indicates the total input power from the engine, the curve designated 52 indicates the mechanical power provided by the first motor/generator 20/24, the curve designated 54 indicates the mechanical power provided by the second motor/generator 22/26 and the curve designated 56 indicates the resultant inlet pressure. At relatively low impeller speed the first electrical machine acts as a motor and the second electrical machine acts as a generator powered by the engine. The node point is indicated by the intersection of the curves designated 52 and 54. As the impeller speed is increased beyond the node point, the first electrical machine becomes a generator and the second electrical machine becomes a motor. As may be seen, at low speeds, one of the motor/generators, in this case the motor/generator 22, 26, acts as a generator powered by the engine and transmits electrical power to the other motor/generator 20, 24, which operates as a motor. As the impeller speed increases, the amount of electrical power transferred reduces to zero, at the node point, and then becomes increasingly negative, which is to say that the motor/generator 20, 24 act as a generator and transfers power to the other motor/generator, which acts as a motor. The node point at which the electrical power transferred is zero is in this case at about 146,000 rpm and this speed is selected to minimise the rating of the electrical machines. This means that for a substantial proportion of the operation of the supercharger, there is relatively little electrical power transferred between the two motor/generators, which maximises the efficiency of the supercharger because electrical losses are minimised due to the fact that a high proportion of the power transmitted by the transmission system is transmitted mechanically, which is inherently more efficient.

Figure 4:
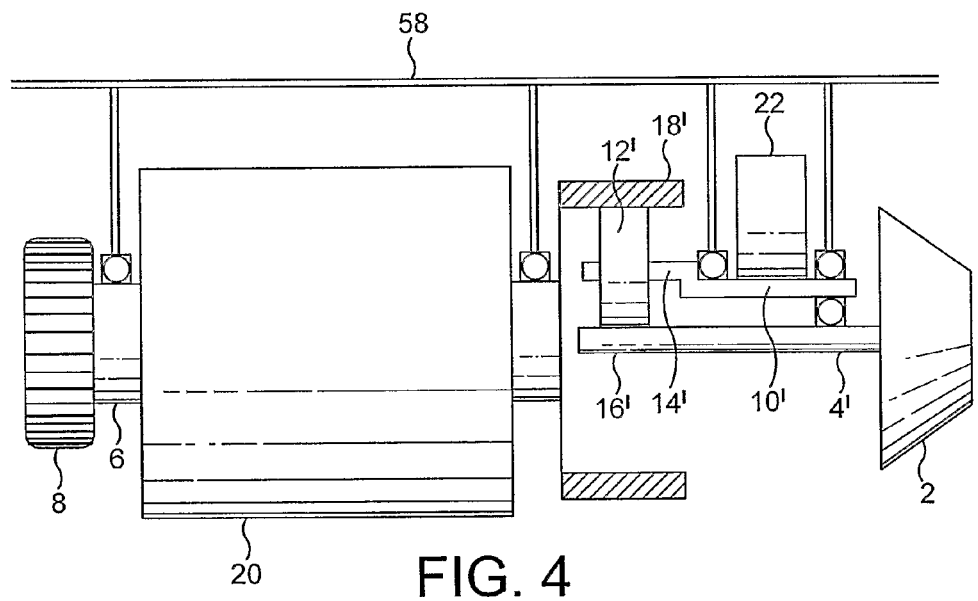
FIG. 4 is a highly schematic view of a third embodiment of automotive supercharger.

FIG. 4 is a highly diagrammatic view of a further embodiment of supercharger which is similar to that illustrated in FIG. 1 but differs from it in one very important respect, namely that the gearwheels of the epicyclic gearset are not toothed but are substantially smooth and are in substantially rolling engagement with one another, whereby the gearset is of known friction or traction type. The supercharger is accommodated within an outer housing 58, which is shown only in part and which carries the various bearings supporting the various rotary shafts.

The epicyclic gearset again comprises an annulus wheel 18', which is in engagement with a number, typically three of planet wheels 12' carried by respective planet shafts 14', which are connected to a common planet carrier 10'. The planet wheels 12' are in engagement with a sun wheel 16', which is significantly smaller than the sun wheel 16 in FIG. 1 and in this case simply constitutes a portion of the length of the output shaft 4'. The input shaft 6 is again connected to the rotor 20 of a first motor/generator but is connected to the annulus wheel 18' of the gearset and not to the carrier. The carrier 10' and not the annulus wheel is connected to the rotor 22 of the second motor/generator.

The operation of the supercharger is substantially the same as that of the supercharger illustrated in FIG. 1 but it should be noted that the use of traction rollers rather than toothed gearwheels permits the sun wheel to be significantly smaller and this results in the achievement of a higher step-up ratio which means that the step-up gearing of the embodiment of FIG. 2 may be omitted but a very high output speed may nevertheless be achieved.

Figure 5:
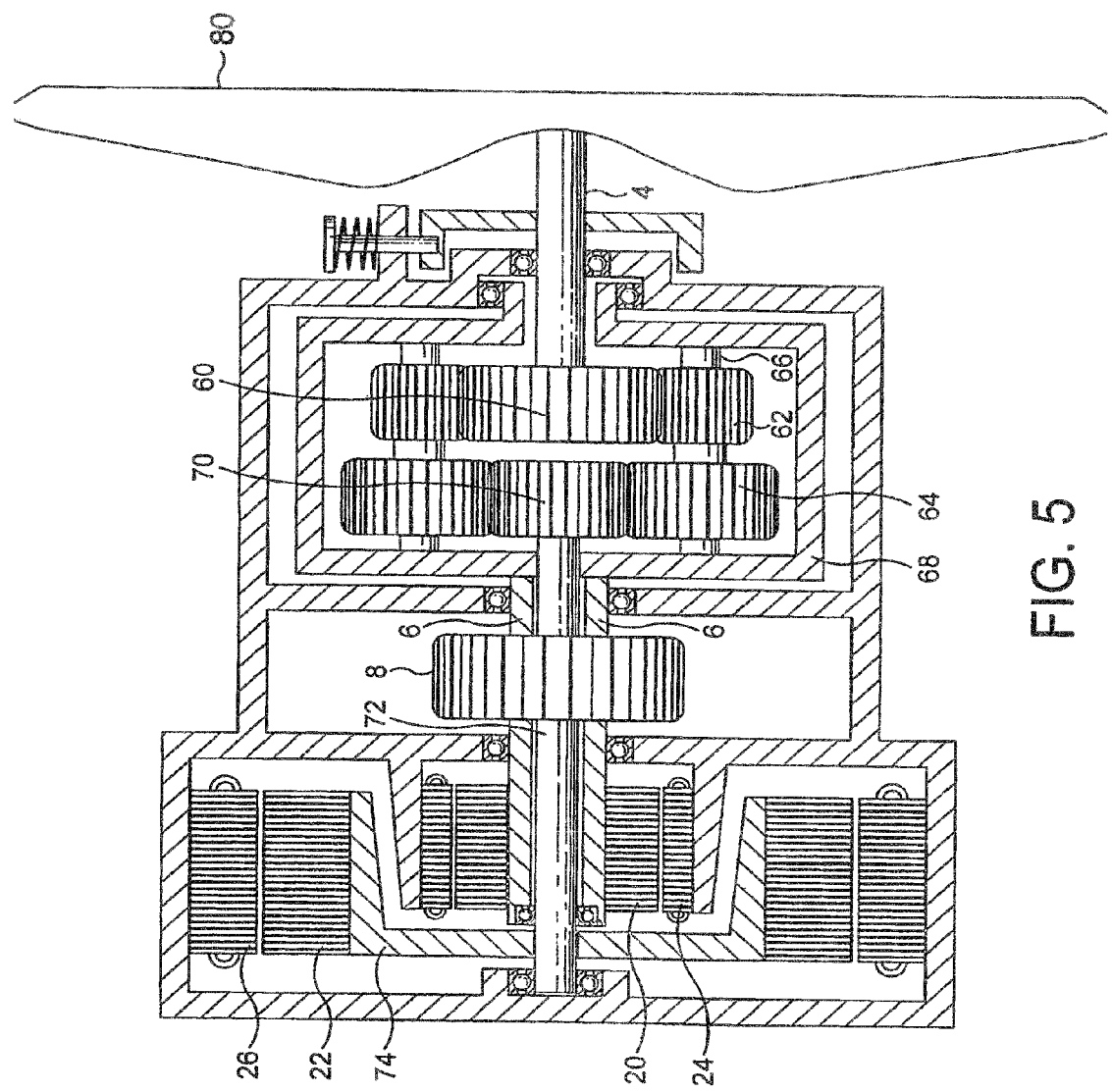
FIG. 5 is a view similar to FIG. 1 of a low speed automotive blower in accordance with the invention, which constitutes a cooling fan.

FIG. 5 shows an alternative embodiment of an air blower which constitutes an automotive fan which is typically situated, in use, adjacent an automotive cooling radiator. In this case, the air pump constitutes a fan wheel or axial impeller 80, which is typically rotated at speeds very much lower than that of a centrifugal impeller. The impeller 80 is connected to the output shaft 4 of a transmission system, the input shaft 6 of which carries a pulley wheel 8 which is driven, in use, by a belt which passes around it and around a further pulley carried by, or connected to be rotated by, the engine crankshaft. The output shaft 4 is connected to a first sun wheel 60 of an epicyclic gearset of positive type, which is in mesh with a plurality of first planet wheels 62. Each first planet wheel 62 is connected to a coaxial second planet wheel 64. Each coaxial pair of planet wheels is rotatably carried on a respective planet shaft 66, which is connected to a common carrier 68, which is in turn connected to the input shaft 6. The second planet wheels 64 are in mesh with a second sun wheel 70, which is connected to a shaft 72 which extends coaxially within the input shaft 6. The shaft 72 carries a flange 74, connected to which is the rotor 22 of a motor/generator, which is of switched reluctance type and includes a stator 26. The input shaft 6 is connected to the rotor 20 of a further similar motor/generator, which includes a stator 24.

Operation of this embodiment is generally similar to that of the first embodiment, but the construction and gear ratios are such that the speed of the impeller is very much lower, with its maximum output speed being not much more than 1000 rpm, as compared to a speed in excess of 100,000 rpm, for the centrifugal impeller of the first embodiment. When operation of the fan is required, the controller, which connects the electrical connections of the two stators together and to a battery, is operated to transfer electrical power from one motor/generator to the other and to change the transmission ratio of the transmission system so that the impeller is rotated, in part by mechanical power transmitted from the engine through the transmission system but in part also by power produced by one of the motor/generators, which operates as a motor and is powered by the other motor/generator, which operates as a generator.

The blower again has a single node point, that is to say one speed, which is somewhat in excess of 1000 rpm in this case, at which the electrical power transmitted between the two motor/generators passes through zero, that is to say at which the operation of the two motor/generators as a motor and a generator, respectively, reverses.

What is claimed is:

1. An automotive air blower system, comprising:
   a supercharger connected to an output shaft of a transmission system, an input shaft of the transmission system being connected, in use, to an engine of a motor vehicle, the input and output shafts being connected to respective branches of a three-branch epicyclic differential gearset, one branch of the gearset and the input shaft being connected to a rotor of respective electrical machines,
   wherein the supercharger comprises a centrifugal impeller wheel,
   wherein a first of the electrical machines constitutes a motor/generator and a second of the electrical machines is configured to operate as a generator,
   wherein each of the first and second electrical machines comprise stators and electrical connections of the stators, and
   wherein the electrical connections of the stators are connected to a controller configured to control a flow of electric power between the first and second electrical machines.

2. The blower as claimed in claim 1, wherein both the first and second electrical machines are configured to function as both a motor and a generator.

3. The blower system as claimed in claim 2,
wherein, at relatively low speed ratios of the air pump to the input shaft, one of the first and second electrical machines operates as a generator and produces electrical power transmitted to the other of the first and second electrical machines, the other of the first and second machines being configured to operate as a motor, and
wherein, at relatively high speed ratios of the air pump to the input shaft, the other of the first and second electrical machines operates as a generator and produces electrical power transmitted to the one of the first and second electrical machines, the one of the first and second machines configured to operate as a motor.

4. The blower system as claimed in claim 1,
wherein the electrical connections of the stators are also connected to a battery, and
wherein the controller is arranged to control the flow of electric power between the first and second electrical machines and the battery.

5. The blower system as claimed claim 1, wherein the epicyclic gearset includes a plurality of toothed gearwheels in meshing engagement.

6. The blower system as claimed in claim 1, wherein the epicyclic gearset comprises a plurality of gearwheels configured to transmit torque from a first of the gearwheels to a second of the gearwheels by one of frictional engagement of surfaces of the gearwheels and a shearing of fluid between the gearwheel surfaces.

7. The blower as claimed in claim 1, wherein the input shaft is connected to a rotor of a first electrical machine, and the one branch of the gearset is connected to a rotor of a second electrical machine, the first electrical machine being in direct connection with the input shaft.

8. The blower as claimed in claim 1, wherein the input shaft is connected to a rotor of a first electrical machine, and the one branch of the gearset is connected to a rotor of a second electrical machine, the input shaft being connected to rotate in synchronism with the rotor of the first electrical machine.

9. The blower system as claimed claim 1, wherein the three-branch epicyclic differential gearset is free of any direct connection with another three-branch epicyclic differential gearset in said blower system.

10. An automotive air blower system, comprising:
an input shaft configured to be connected to an engine of a motor vehicle;
an output shaft;
a supercharger comprising a centrifugal impeller wheel connected to the output shaft;
a three-branch epicyclic differential gearset comprising a sun wheel in engagement with a plurality of planet wheels, the planet wheels being carried by a common carrier and in engagement with an annulus wheel;
a first electrical machine, comprising a first stator and a first rotor, having at least one of a motor capability and a combination motor/generator capability;
a second electrical machine, comprising a second stator and a second rotor, having at least one of a generator capability and a combination motor/generator capability; and
an electronic controller,
wherein a first electrical connections of the first stator and a second electrical connections of the second stator are connected to the controller,
wherein the electronic controller is configured to control a first flow of electric power between a battery and any of the first and second electrical machines, and further configured to control a second flow of electric power between the first and second electrical machines,
wherein each of the sun wheel, the carrier, and the annulus wheel is respectively connected to one of the input shaft, the supercharger, and a rotor of the second electrical machine,
wherein the first rotor of the first electrical machine is positioned to be directly driven by the input shaft in synchronism therewith, and
wherein the three-branch epicyclic differential gearset is free of any direct connection with another three-branch epicyclic differential gearset.

11. The automotive air blower system as claimed in claim 10, wherein the first rotor is connected to the input shaft at a position between the three-branch epicyclic differential gearset and a point of connection with the engine.

12. The automotive air blower system as claimed in claim 10, wherein the first rotor is mounted to a surface of the input shaft along a length of the input shaft.

* * * * *